United States Patent [19]

Khambatta et al.

[11] Patent Number: 5,171,451
[45] Date of Patent: Dec. 15, 1992

[54] SIMULTANEOUS USE OF WATER SOLUBLE POLYMERS WITH OZONE IN COOLING WATER SYSTEMS

[75] Inventors: Binaifer S. Khambatta, Naperville; Paul R. Young, Wheaton; Kenneth E. Fulks, Brookfield, all of Ill.

[73] Assignee: Nalco Chemical Company, Naperville, Ill.

[21] Appl. No.: 706,469

[22] Filed: May 28, 1991

[51] Int. Cl.$^5$ .............................................. C02F 5/12
[52] U.S. Cl. .................................... 210/701; 210/760; 210/764; 422/9; 422/16; 422/17
[58] Field of Search ................................ 210/696–701, 210/760, 764; 422/9, 16, 17

[56] References Cited

U.S. PATENT DOCUMENTS

| | | | |
|---|---|---|---|
| 4,172,786 | 10/1979 | Humphrey et al. | 210/760 |
| 4,724,125 | 2/1988 | Tsuneki et al. | 252/396 |
| 4,919,821 | 8/1988 | Fong et al. | 210/698 |
| 4,936,987 | 6/1990 | Persinski et al. | 210/701 |
| 4,997,571 | 3/1991 | Roensch et al. | 210/760 |

OTHER PUBLICATIONS

"Degradation rate of water-soluble polymers by ozone", Chemical Engineer Communications, Ikemizu, et. al., 34(1–6) pp. 77–85, 1985.

"UV-irradiated ozonation of water-soluble polymers", Journal of Applied Polymer Science, Imamura, et. al., 25(6), pp. 997–1005, 1980.

"Ozone treatment of water-soluble polymers v. ultraviolet irradiation effects on the ozonation of polyacrylamide", Journal Applied Polymer Science, Suzuki, et. al., pp. 999–1006, 24(4), 1979.

*Primary Examiner*—Peter Hruskoci
*Attorney, Agent, or Firm*—Robert A. Miller; James J. Drake

[57] ABSTRACT

We have determined that simultaneous use in industrial waters of certain water soluble polymers in the presence of ozone is acceptable for scale control, corrosion control, microbiological control and the like. The preferred polymers used with ozone and those polymers that are homopolymers and copolymers containing at least 50 mole percent of acrylic acid or methacrylic acid, mixtures thereof. Certain other monomers may be used with the acrylic acid and methacrylic acid monomers, and still function as scale inhibitors and corrosion inhibitors in the presence of ozone in industrial waters. The industrial waters are particularly recirculating cooling waters.

9 Claims, No Drawings

SIMULTANEOUS USE OF WATER SOLUBLE POLYMERS WITH OZONE IN COOLING WATER SYSTEMS

INTRODUCTION

The use of ozone in cooling waters, particularly recirculating cooling waters has been recently touted as an answer to control microbiological growth in these recirculating waters, and is also now being touted as a sole treatment including possible inhibition of corrosion and for scale inhibition.

Normally, certain additives are added to cooling waters, particularly those cooling waters that have characteristics that might lead to hardness precipitates such as calcium and/or magnesium carbonate precipitates, to prevent these precipitates from accumulating and depositing on heat transfer surfaces, fouling these surfaces and contributing to lost energy efficiency in the process. Because ozone is such a strong oxidizing agent, there are many references to its reacting with organic materials, including these agents purposefully added as scale inhibitors, to degrade these organics. The presumption is that such degradation would eliminate any scale inhibiting characteristics that might be present when scale inhibitor chemicals are being used.

THE PRIOR ART

Examples of these teachings include a teaching by Ikemizu, et. al., Chemical Engineer Commun., 34(1-6), 77-85, 1985, wherein water soluble polymers are taught to be degraded by ozone and that the degradation rate is defined by change in the weight average molecular weight per unit time. Ikemizu teaches that the rate of degradation for poly(oxyethylenes) was proportional to 1.5 to 2.0 powers of the molecular weight and was 20 to 60 times higher than the rate of degradation of poly(acrylamides). He taught that the degradation rate of poly(sodium acrylate) was proportional to the 2.0 power of the molecular weight.

Hanasaki, in Kankyo Gijutsu, 13(11), 817-20, (1984), taught that poly(acrylamide) was ozonized to remove it from waste waters. His observations indicated that chain severing occurred in a random fashion and that ozonation produced a carbonyl(aldehyde), carboxylate functionalities and ketone groups. Although he states that the amide groups in poly(acrylamide) were not themselves attacked by ozone, these teachings and others, such as Imamura, et. al., in the Journal of Applied Polymer Science, 25(6), 997-1005, (1980), taught destruction of polymers and UV light acceleration of ozonation of water soluble polymers, particularly polyethylene glycol, polyacrylamide, and poly(vinyl alcohol).

In general, chain cleavage of polymers was observed in the presence of ozone, and this was accelerated in the presence of UV irradiation. Various products were observed in the ozonation reaction including formaldehyde and the presence in oligomers of ketones, carboxylic acids, terminal aldehydes, and the like. (See for example Suzuki, et. al., Journal Applied Polymer Science, 24(4), 999-1006, (1979).

Other numerous authors have determined that ozonation causes polymer degradation in aqueous solutions containing various water soluble polymers.

It would have appeared then from these various treatments appearing in the prior art that water soluble polymers traditionally used to maintain calcium and other hardness components in solution in recirculating cooling waters would suffer a negative fate in the presence of ozone. Ozone would be expected to degrade these polymers to the point where their usefulness would no longer exist for the purpose of maintaining calcium carbonate in solution or suspension and preventing scale formation on heat transfer surfaces in contact with the waters containing hardness.

OBJECTS OF THE INVENTION

It is, therefore an object of this invention to describe certain polymeric organic water soluble polymers, which are found to retain and maintain their ability to keep hardness precipitates in solution or in suspension in recirculating waters even in the presence of ozone.

It is another object of the invention to treat recirculating cooling waters containing certain degrees of calcium/magnesium hardness, certain "M" alkalinities and operating in certain pH ranges with both ozone and organic vinylic polymers having the capability in the presence of ozone to retain and maintain their calcium carbonate saturation ratio indicating that they are still useful for scale inhibition in these industrial cooling waters.

It is yet another object of this invention to treat ozonated cooling waters with certain kinds of polymers having initial molecular weights ranging from about 1500 to about 35,000 and initial calcium carbonate saturation ratios of at least 80, preferably at least 90, and most preferably at least 100, which polymers when exposed to ozone in the cooling waters retain at least 70 percent, and preferably at least 80 percent, of the initial calcium carbonate saturation ratios measured. This maintenance of their ability to maintain calcium carbonate at saturation levels or above is maintained in spite of the fact that these polymers are, in fact, undergoing molecular weight degradation apparently via ozonation reactions.

Finally, it is a final object of this invention to treat cooling waters with both ozone and particularly carboxylic acid containing polymers, particularly those polymers that contain at least 50 mole percent (meth)acrylic acid or water soluble salts thereof, and which polymers have initial calcium carbonate saturation ratios of at least 90, initial weight average molecular weights ranging from about 1500 to about 35,000, and after ozonation in cooling waters at temperatures ranging from 18° C. to about 60° C. for 30 minutes or more, the ozonated calcium carbonate saturation ratio is at least 70 percent of the initial calcium carbonate saturation ratio measured for the polymer.

THE INVENTION

We have invented a method of treating recirculating cooling waters comprising adding thereto, in effective amounts to inhibit microbiological growth and inorganic scale formation on heat transfer surfaces in contact with said cooling waters, both ozone and an organic water soluble vinylic polymer having a calcium carbonate saturation ratio of at least 90 and containing at least 50 mole percent (meth)acrylic acid or its salts, and having a weight average molecular weight ranging from about 1,500 to about 35,000, which polymer after exposure to at least 0.1 parts per million ozone in said waters for at least 30 minutes at temperatures ranging from about 18° C. to about 60° C. retained at least 70 percent of their original calcium carbonate saturation ratio.

The preferred organic water soluble vinylic polymers are those polymers that contain at least 50 mole percent (meth)acrylic acid, preferably at least 60 mole percent (meth)acrylic acid, and most preferably, from 70 to 100 mole percent (meth)acrylic acid, or as water soluble salts thereof. These preferred polymers also have an initial or original calcium carbonate saturation ratio of at least 90, preferably at least 100, and most preferably at least 110.

By the term (meth)acrylic acid or its salts, we mean to include exclusively acrylic acid monomer, exclusively methacrylic acid monomer, or any admixture of acrylic acid and methacrylic acid monomers, whether present as the free acid or partially neutralized salt or completely neutralized salt of these free acids. To form the salts, any common base alkali metal or alkaline earth metal, ammonia, low molecular amine, or low molecular quaternary salt hydroxides, may be used. For the most part, the (meth)acrylic acid polymers are formed by polymerizing the monomers, acrylic acid, methacrylic acid, or mixtures thereof, or salts thereof, and the polymers may be either partially or completely neutralized, as in the sodium, potassium, ammonium or mixtures thereof salt forms. Other salt forms, either completely or partially neutralized, however, are incorporated and included within the concepts of this invention.

The organic water soluble vinylic polymers that contain at least 50 mole percent (meth)acrylic acid, preferably have a weight average molecular weight ranging from about 1500 to about 35,000 initially. Exposure to ozone under varying conditions have been demonstrated to lower this molecular weight average, but even though this molecular weight average is lower, the calcium carbonate saturation ratio must be maintained at a level at least 70 percent of the initial calcium carbonate saturation ratio obtained from the non-ozonated polymer.

Preferably, these organic water soluble vinylic polymers contain at least 60 mole percent (meth)acrylic acid, and can also contain at least one of the following comonomers chosen from the group consisting of (meth)acrylamide, maleic anhydride, N-methylsulfonic acid-(meth)acrylamide, (hereafter AMS), N-ethylsulfonic acid(meth)acrylamide, (hereafter AES), vinyl sulfonic acid, itaconic acid, $C_1$-$C_3$ esters of acrylic acid, hydroxypropyl acrylate, N-t-butyl acrylamide, vinyl acetate, vinyl ethers, acrylamidomethylpropane sulfonic acid (AMPS), and other similar vinylic monomers, which are successfully polymerized with acrylic acid, methacrylic acid, or mixtures thereof. In general, the term (meth) followed by a monomer identity is meant to include that monomer, the methylated monomer, and mixtures thereof, as earlier explained for (meth)acrylic acid.

Most preferably, the polymers to be used in conjunction with ozone are homopolymers of acrylic acid, homopolymers of methacrylic acid, and/or copolymers containing at least 70 mole percent of acrylic acid, and methacrylic acid, or mixtures thereof, which copolymers also contain at least one monomer chosen from the group consisting of acrylamide, maleic anhydride, AMS(N-methylsulfonate acrylamide), AES(N-ethylsulfonate-acrylamide), AMPS (acrylamidomethylpropane sulfonic acid), N-tertiary butyl acrylamide, itaconic acid, C1 to C3 esters of acrylic acid, particularly the isopropyl ester of acrylic acid, hydroxypropylacrylate, and such similar vinylic monomers as will obtain water soluble (meth)acrylic acid polymers when polymerized with (meth)acrylic acid or salts thereof.

By the term "salts", when referring to our polymers, we mean any completely or partially neutralized salt form of the polymer which is water soluble, primarily and preferably the sodium, potassium salts, or mixtures thereof.

In general, the preferred sulfonated monomers useful in forming a copolymer are illustrated by the formula:

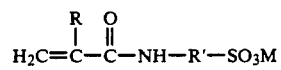

where:
R is H, $CH_3$, or mixtures thereof;
R' is a linear or branched alkylene group containing from 1–4 carbon atoms;
and M is H, alkali metal, alkaline earth metal, protonated amine, ammonium, or quaternary ammonium, or mixtures thereof.

Our invention, particularly, involves a method of treating recirculating cooling waters comprising adding thereto in effective amounts to inhibit microbiological growth and inorganic scale formation on heat transfer surfaces in contact with said cooling waters, of both ozone and organic water soluble vinylic polymers, which polymers are chosen from the group consisting of homopolymers of acrylic acid, homopolymers of methacrylic acid, and/or the copolymers described above of acrylic acid and/or methacrylic acid, or their water soluble salts. In the practice of the preferred invention, the ozone is maintained at a concentration of at least 0.01 parts per million residual ozone in the recirculating waters, and the ozone is added at a sufficient rate to maintain this residual concentration of ozone. However, because of the reactive nature of the ozone, the concept of maintaining 0.01 ppm ozone includes the situation where, at the furthest point in the cooling system from the ozone addition points, the concentration of ozone may drop to zero.

Also, the polymer, which may have an initial weight average molecular weight of from 1500–35,000, is added at a concentration and rate that would be sufficient to maintain at least 2 ppm active polymer in the cooling waters treated. An initial active polymer concentration ranging from at least two and preferably, from 5 to 100 parts per million polymer, based on cooling water treated is normally achievable.

It is most preferable to treat these waters with homopolymers, copolymers, or mixtures thereof, of acrylic acid which polymers have an initial molecular weight ranging from about 1500 to about 25,000, preferably from about 2,000 to about 15,000, and most preferably from about 2,000 to about 10,000. This molecular weight is a weight average molecular weight as determined by aqueous gel permeation chromatography using a polystyrene sulfonate set of standard polymers. All of the molecular weights reported in this specification were determined by gel permeation chromatography (GPC) using the same polystyrene sulfonate standard sets.

When copolymers are used in conjunction with ozone to treat cooling waters, these copolymers are preferably copolymers of (meth)acrylic acid or its water soluble salts with at least one of the vinylic monomers chosen from the group consisting of (meth)acrylamide, maleic anhydride, AMS, AES, AMPS (acrylamido methyl propane sulfonic acid), itaconic acid, C1–C3 esters of acrylic acid, hydroxypropyl acrylate, N-tertiary butyl acrylamide, vinyl acetate, methyl vinyl ether, and the like. Again, the term (meth)acrylamide is used to mean acrylamide, methacrylamide, or any mixtures thereof. When copolymers are used containing at least one of these other vinylic monomers, it is preferable that the copolymer contain at least 60 mole percent of (meth)acrylic acid and most preferable that it contains at least 70 mole percent of the (meth)acrylic acid monomers, or their salts. The most preferred copolymers are those containing at least 70–100 mole percent acrylic acid.

As the waters to be treated are ozonated, it is most preferable to maintain these cooling waters at an ozone residual concentration of at least 0.05 ppm, based on the treated cooling waters, and to add polymers at rates sufficient to obtain an initial active polymer concentration of at least two parts per million, and preferably from 5 to 100 parts per million, and most preferably from 5 to 50 parts per million of the active polymer being added to the cooling waters. Mixtures of polymers may also be used when advantageous, and when mixtures are used, the total polymer weight concentration should be as above.

The Cooling Waters

The waters for the cooling systems being treated with both ozone and polymers of this invention can have characteristics such as the following:

| Parameters | Range |
| --- | --- |
| pH | 6.5–9.7 |
| Ca Hardness | 20–2000 ppm (as CaCO$_3$) |
| Mg Hardness | 10–1000 ppm (as CaCO$_3$) |
| Total Hardness | 30–3000 ppm (as CaCO$_3$) |
| SiO$_2$ | 0.10–125 ppm (as SiO$_2$) |
| "M" alkalinity | 20–2500 ppm (as CaCO$_3$) |
| Temperature | 10° C.–60° C. |

Although the initial concentrations of each element listed above in waters being treated are those within the lower limits of the ranges above, these limitations can increase when the waters are concentrated in a cooling water application, often from a factor ranging from about 2 up to as high 60 or above, and can lead to waters in the recirculation systems and blowdown system having concentration limits considerably higher than the upper limits listed above.

Normally the recirculating cooling waters are treated with ozone from any useful ozone generator, and there are many available in the art, and the ozone is added to the recirculating waters at a concentration sufficient to maintain in the recirculating cooling waters, a residual ozone level of at least 0.01 parts per million based on the treated cooling waters, and preferably at least 0.05 parts per million ozone, or above.

The polymers of primary interest in this invention are those polymers, which can withstand ozonation at low concentrations up to concentrations nearing ozone saturation, such that ozone levels can range from at least 0.01 ppm up to concentrations, i.e. of approximately 2.0–2.5 parts per million ozone in water. Even with these exposures to ozone, the polymers maintain at least 70%, preferably at least 80%, of their initial calcium carbonate saturation ratio. Certain homopolymers and copolymers have shown particular propensity for usefulness in the presence of ozone. These polymers are normally homopolymers of acrylic acid or copolymers of acrylic acid which contain at least 60 mole percent acrylic acid, preferably 70 mole percent acrylic acid or higher. The acrylic acid is most preferably copolymerized with acrylamide, itaconic acid, AMS, AES, AMPS, C$_1$–C$_3$ esters of acrylic acid, hydroxypropyl esters of acrylic acid, or mixtures thereof. The molecular weight of these homopolymers and copolymers normally range initially from 1500 to about 35,000 although, as before, this molecular weight is degraded in contact with ozone. Preferably, the polymers have an initial molecular weight of from 2,000–15,000. In spite of this molecular weight degradation, the preferred polymeric polymers retain ozonated or oligomeric components after ozone is reacted with these copolymers which ozonated components maintains at least 70 percent and preferably 80 percent of the initial calcium carbonate saturation ratio of the starting copolymer.

The Calcium Carbonate Saturation Ratio (CCSR)

The calcium carbonate saturation test is completed as follows. A test solution is prepared by adding the chloride or sulfate salts of calcium and magnesium, the polymeric inhibitor, and a solution of sodium bicarbonate to deionized water. Initial concentrations of these salts should be adjusted to achieve 360 parts per million calcium, 200 parts per million magnesium, 500 parts per million bicarbonate (as calcium carbonate), and 15 parts per million of the polymeric inhibitor on an active solids polymer basis.

This inhibited hardness/bicarbonate solution was then ozonated at ambient temperatures for a total ozonation time of 90 minutes. During the first 60 minutes of ozonation, an ozone level less than 1 part per million ozone residual was maintained. During the final 30 minutes of ozonation, the level of residual ozone was increased so as to maintain approximately 1.0 to 2.3 parts per million ozone.

During the test times, alkalinity, pH, and ozone residuals were monitored at set time intervals.

Water samples from these test containers were collected at 0, 30, 60 and 90 minutes of ozonation, and tested for calcium carbonate inhibition activity via the calcium carbonate saturation ratio test, or CCSR test.

This CCSR test involves the following:

The collected solutions are placed in a hot water bath at temperatures maintained at 140° F. The solution is stirred at all times and pH is continuously monitored. The sample is titrated with dilute sodium hydroxide (0.1 molar) at a constant rate of addition. As the dilute sodium hydroxide solution is added, the pH of the test solutions slowly increases, then decreases slightly, and then increases again. The maximum pH prior to the slight decrease is referred to as the "breakpoint pH". A mineral solubility computer program is then used to calculate the calcium carbonate supersaturation ratio defined below based on test conditions at the breakpoint pH. This supersaturation ratio is related to the calcium carbonate inhibition performance or the calcium carbonate saturation ratio. The test procedure was repeated for different inhibitor solutions. The method for calculating CCSR is outlined by Johnson, et. al., International Water Conference, October, 1989*, which reference is incorporated herein by reference. The test procedure is also taught in Fong, et al, U.S. Pat. No. 4,919,821, incorporated herein by reference.

*Computerized water modeling in the Design and Operation of Industrial Cooling Systems by Don Johnson and Ken Fulks, presented at the 41st Annual Meeting, International Water Conference, Pittsburgh, Pa., Oct. 20-22, 1980.

Preferably, when completing multiple tests, all precipitated calcium carbonate should be removed from test apparatus containers prior to the next test. This inhibits nucleation, which would foul the test results.

The theory behind the above test is dependent on the formation of scale above a particular critical pH. Consequently, sodium hydroxide is added to the test solution to increase the pH and to supersaturate the test water until the breakpoint pH is reached. Nucleation and crystal growth occur at this point. The measured break point pH is then used in a computer program based on mineral solubility prediction models to calculate a value called the saturation ratio. The saturation ratio is simply an index for predicting the formation of calcium carbonate and the computer program saturation ratio compensates for temperature, high ionic strength, ion paring effects, and the like. Other important factors included in the mineral solubility analysis are water composition, operating conditions, temperatures, break point pH, cycles of concentration, and acid control. A calcium carbonate saturation ratio is theoretically equal to the product of the concentration of calcium times the concentration of carbonate ions divided by the solubility product constant for calcium carbonate. The higher the CCSR, the better the polymer will be as a scale inhibitor.

Polymer Maintenance of Calcium Carbonate Saturation Ratios

The homopolymers and copolymers found useful in our invention are those polymers that initially contain a calcium carbonate saturation ratio (CCSR) of at least 90 preferably at least 100, and most preferably at least 110. Initial calcium carbonate saturation ratios can be as high 120-140. Typical initial calcium carbonate saturation values range from about 110 to about 135, and in some cases slightly higher. The homopolymers of acrylic acid normally have initial calcium carbonate saturation ratios ranging between about 110 and 137.5. The copolymers normally have initial calcium carbonate saturation ratios of at least 90, preferably at least 100, and most preferably from about 110 to about 135.

These polymers are added to representative test cooling waters and ozonated for 90 minutes. During the initial 60 minutes, the ozone level is maintained at concentrations ranging from about 0.01 to about 0.8 parts per million and during the last 30 minutes, the ozone residual is raised by increasing the rate of addition of ozone to these waters so that the residual is from about 1.0 to about 2.3 parts per million. The ozonation tests are run at temperatures ranging from ambient, about 18° C., to 60° C. for a period of about 90 minutes as described. The last 30 minutes of the test is at temperatures of about 40°-60° C.

After the ozonation reaction has taken place, the molecular weight degradation is observed in all cases. Sometimes, the degree of molecular weight degradation relates to the initial molecular weight of the polymer added. However, even though these molecular weight degradations can range anywhere from as little as about 25 percent to as much as 85 percent of the original molecular weight, the calcium carbonate saturation ratio for those polymers that are successfully used in our invention is maintained at about 70 percent of the initial value, preferably 80 percent of the initial value or higher. In some cases, ozonation actually increases the calcium carbonate saturation ratio.

If a polymer does not maintain at least 70 percent of its initial calcium carbonate saturation ratio, and more preferably at least 80% of its initial CCSR value, the polymer is not believed to be useful in combination with ozone in treating cooling waters.

To further describe our invention the following tables are presented. These tables list certain polymers in terms of their chemical nature, molecular weight, initial and ozonated calcium carbonate saturation ratios, and give such other data as would be of interest. All of these tests were run in beakers and/or containers, which provide test results equivalent to those results expected in actual field use in recirculating cooling waters.

TABLE 1

SUMMARY CALCIUM CARBONATE SATURATION RATIO SCREENING TEST DATA

| Inhibitor (15 ppm) | Before Ozonation | Activity After Ozonation | Hach Test ppm Ozone Residual |
|---|---|---|---|
| Polymer A | 136.9 ± 6.6 | 124.8 ± 6.6 | 2.3 ppm + |
| Polymer B | 133.9 ± 6.6 | 138.8 ± 6.6 | 0.8-1.0 ppm |
| Polymer B | 119.9 ± 6.6 | 110.6 ± 6.6 | 1.2-2.3 ppm + |
| Polymer C | 131.9 ± 6.6 | 128.9 ± 6.6 | 1.2-2.3 ppm + |
| Polymer D | 113.7 ± 6.6 | 128.9 ± 6.6 | 1.0-1.8 ppm |
| Polymer E | 28.6 ± 6.6 | 80.0 ± 6.6 | 2.3 ppm + |
| Polymer F | 97.1 ± 6.6 | 103.3 ± 6.6 | 2.3 ppm + |
| Polymer G | 97.1 ± 6.6 | 97.1 ± 6.6 | 1.3-2.3 ppm + |
| Polymer H | 107.5 ± 6.6 | 85.4 ± 6.6 | 1.4 ppm |
| Polymer I | 125.9 ± 6.6 | 97.1 ± 6.6 | 1.2 ppm |
| Polymer J | 85.4 ± 6.6 | 69.9 ± 6.6 | 1.8-2.3 ppm + |
| Polymer L | 107.5 ± 6.6 | 113.7 ± 6.6 | 2.3 ppm + |
| Polymer M | 131.9 ± 6.6 | 131.9 ± 6.6 | 2.3 ppm + |
| PBTC | 145.9 ± 6.6 | **sample precipitated | |
| HEDP | 137.7 ± 6.6 | **sample precipitated | |
| Blank | 3.0 ± 6.6 | **sample precipitated | |

**Calcium Carbonate Saturation Ratio
*Unable to determine a saturation ratio value due to sample precipitation before calcium carbonate test was conducted. This indicates a very low result and complete loss of calcium carbonate inhibition activity.

In Table 1, you can see the results of adding various polymers to cooling waters and then ozonating these mixtures for a period of 90 minutes, as described above. After this ozonation, the calcium carbonate saturation ratio is measured. The results in Table 1 show that those polymers which are preferred, are the polymers that retain at least 70 and more preferably at least 80 percent of their initial calcium carbonate saturation ratio. In some cases after ozonation the ozonated saturation ratio is higher than the initial calcium carbonate saturation ratio. Also in Table 1, you can see that several organic phosphonates were tested. These materials have traditionally been used in treating cooling waters for hardness control and under ozonation conditions fail miserably. Blanks were also run to give the observer reasonable basis and background for the test results.

TABLE II

Summary of Average Molecular Weight and Molecular Number Results for Ozonated Polymers

| Inhibitor | Before Ozonation | After Ozonation |
|---|---|---|
| Polymer K | Mw: 39,700 | Mw: 2,400 |
| | Mn: 18,600 | Mn: 2,000 |
| Polymer B | Mw: 4,400 | Mw: 2,600 |
| | Mn: 3,500 | Mn: 2,100 |
| Polymer A | Mw: 5,000 | Mw: 2,500 |
| | Mn: 3,000 | Mn: 2,000 |

Table II, is a summary of the average molecular weight and molecular number results obtained for ozonated polymers. Certain polymers were tested before and after ozonation, and their molecular weights determined again by GPC chromatography. As can be seen, when molecular weight is relatively high, the degree of degradation observed after ozonation is also high, when a molecular weight starts relatively low the degree of degradation of molecular weight is less, but there seems to be a fairly consistent molecular weight measured for all polymers irrespective of the initial molecular weight of these polymers. However, this data is limited, and we cannot limit the invention in terms of the ozonated final molecular weight.

TABLE III

POLYMER COMPOSITIONS

| | |
|---|---|
| *Polymer A: | Polyacrylic acid homopolymer neutralized with NaOH, Mw: 5,000 |
| *Polymer B: | Isopropyl ester of acrylic acid (low ester content), Mw: 5,000 |
| Polymer C: | Water soluble acrylic acid polymer, Mw: 5,100 |
| Polymer D: | Water soluble acrylic acid polymer, Mw: 5,800 |
| Polymer E: | Water soluble acrylic acid polymer, Mw: 240,000 |
| *Polymer F: | Methyl sulfonic acid acrylamide, 50–60% acrylic acid/14–20% aminomethanesulfonate/remainder acrylamide, Mw: 18,000–19,000 |
| *Polymer G: | 70% acrylic acid/30% acrylamide copolymer, Mw: 30,000 |
| Polymer H: | Hydrolyzed polymaleic anhydride, Mw: 1,000 |
| Polymer I: | Terpolymer of acrylic acid, methacrylic acid and itaconic acid. Mw: 1,000 |
| Polymer J: | Polymethacrylic acid, Mw: 25,000–30,000 |
| *Polymer K: | Ethyl sulfonic acid acrylamide, ("AES") taurine derivative, Mw: 40,000 |
| *Polymer L: | 70–80 mole % acrylic acid/20–30 mole % hydroxypropylacrylate, Mw: 6,000–10,000 |
| Polymer M: | 65–75 mole % acrylic acid/25–35 mole % acrylamidomethylpropane sulfonic acid, Mw: 10,000–15,000 |

*All molecular weights are weight average molecular weights determined by GPC using set standards of polystyrene sulfonate.
The molecular weights of polymers not makred by * above were molecular weights provided by the manufacturer and are believed to be weight average molecular weights. However, test procedures for molecular weight determination are not known.

Table III describes polymers A through M in terms of their chemical structure and initial molecular weights. In Table III, the methylsulfonic acid, acrylamide polymers are those that contain from 50 to 60 mole percent acrylic acid, from 10 to 20 mole percent acrylamido, N-methyl sulfonates (AMS) and the remainder acrylamide. Polymer K also contains from 50 to 60 mole percent acrylic acid, from 10 to 30 percent N-ethylsulfonic acid acrylamide(AES); the remainder being acrylamide.

The remainder of the Tables, up to Table XVIII, provides additional information specifically for each of the polymers listed. Again, these tests show the ability of the specified polymers to maintain their calcium carbonate saturation ratio, even after the contact with ozone for periods of time known to lead to polymer degradation in terms of weight average molecular weight. In spite of this polymer degradation, certain of these polymers still maintain their ability to inhibit calcium carbonate scale formation in the presence of ozone.

TABLE IV

Benchtop Scale Inhibition Screening Test
for Calcium Carbonate
Inhibitor: Polymer A
Dosage: 15 ppm inhibitor as actives

| Ozonation Time | Ozone Level* | Saturation Ratio |
|---|---|---|
| no ozone | 0.0 ppm | 136.9 ± 6.6 |
| 2.5% O3 output | | |
| 30 minutes O3 | 0.55–0.6 ppm | 142.6 ± 6.6 |
| 60 minutes O3 | 0.55–0.6 ppm | 144.3 ± 6.6 |
| 25% O3 output | | |
| 90 minutes O3 | 2.3 ppm + | 124.8 ± 6.6 |

Polymer A continued to behave as a calcium carbonate inhibitor after 60 minutes of ozonation. However, after 30 additional minutes of exposure to very high levels of ozone, there was a decrease in activity which is within experimental error.
*Ozone level was determined by the Hach test.

TABLE V

Benchtop Scale Inhibition Screening Test
for Calcium Carbonate
Inhibitor: Polymer B
Dosage: 15 ppm inhibitor as actives

| Ozonation Time | Ozone Level* | Saturation Ratio |
|---|---|---|
| no ozone | 0.0 ppm | 133.9 ± 6.6 |
| 2.5% O3 output | | |
| 30 minutes O3 | 0.5 ppm | 136.5 ± 6.6 |
| 60 minutes O3 | 0.4 ppm | 139.7 ± 6.6 |
| 15% O3 output | | |
| 90 minutes O3 | 0.8–0.9 ppm | 138.8 ± 6.6 |

The saturation ratio values indicate that Polymer B is maintaining its calcium carbonate inhibition activity even at unrealistically high ozone levels.
*Ozone level was determined by the colorimetric Hach Test.

TABLE VI

Benchtop Scale Inhibition Screening Test
for Calcium Carbonate
Inhibitor: Polymer B
Dosage: 15 ppm inhibitor as actives

| Ozonation Time | Ozone Level* | Saturation Ratio |
|---|---|---|
| no ozone | 0.0 ppm | 119.9 ± 6.6 |
| 2.5% O3 output | | |
| 30 minutes O3 | 0.7–0.8 ppm | 131.9 ± 6.6 |
| 60 minutes O3 | 0.6–0.7 ppm | 137.7 ± 6.6 |
| 15% O3 output | | |
| 90 minutes O3 | 1.2 ppm | 110.6 ± 6.6 (113.7 recheck) |

These saturation ratio values indicate that Polymer B is increasing in activity for the first 60 minutes of low level ozonation, and then drops to approximately the same performance level as the initial unozonated sample. When comparing this run of the Polymer B sample to the results in table I, note that the unozonated sample has a lower saturation ratio value to begin with, and used a different batch sample. This sample also experienced ozone levels of 2.3 ppm and greater, at 75 minutes of ozonation, while the highest ozone reading recorded for table I was 1.0 ppm at 75 minutes of ozonation. The Mw is −2,100, after ozonation.
*Ozone level was determined by the colorimetric Hach Test.

TABLE VII

Benchtop Scale Inhibition Screening Test
for Calcium Carbonate
Inhibitor: Polymer C
Dosage: 15 ppm inhibitor as actives

| Ozonation Time | Ozone Level* | Saturation Ratio |
|---|---|---|
| no ozone | 0.0 ppm | 131.9 ± 6.6 |
| 2.5% O3 output | | |
| 30 minutes O3 | 0.65 ppm | 125.9 ± 6.6 |
| 60 minutes O3 | 0.6 ppm | 128.9 ± 6.6 |
| 15% O3 output | | |

TABLE VII-continued

Benchtop Scale Inhibition Screening Test
for Calcium Carbonate
Inhibitor: Polymer C
Dosage: 15 ppm inhibitor as actives

| Ozonation Time | Ozone Level* | Saturation Ratio |
|---|---|---|
| 90 minutes $O_3$ | 1.2 ppm | 128.9 ± 6.6 |

The saturation ratio values indicate that Polymer C is maintaining its calcium carbonate inhibition activity at high ozone levels. The Mw of this sample is −5,100 and overall, is a very good calcium carbonate inhibitor.
*Ozone level was determined by the colorimetric Hach Test.
Mw = Weight average molecular weight by GPC chromatography using polystyrene sulfonate standards.

TABLE VIII

Benchtop Scale Inhibition Screening Test
for Calcium Carbonate
Inhibitor: Polymer D
Dosage: 15 ppm inhibitor as actives

| Ozonation Time | Ozone Level* | Saturation Ratio |
|---|---|---|
| no ozone | 0.0 ppm | 113.7 ± 6.6 |
| 2.5% O3 output | | |
| 30 minutes $O_3$ | 0.65 ppm | 125.9 ± 6.6 |
| 60 minutes $O_3$ | 0.65 ppm | 134.8 ± 6.6 |
| 15% O3 output | | |
| 90 minutes $O_3$ | 1.0 ppm | 128.9 ± 6.6 |

The saturation ratio values indicate that Polymer D is actually improving in activity upon ozonation. The Mw of this polymer is initially −5,800.
*Ozone level was determined by the colorimetric Hach Test.

TABLE IX

Benchtop Scale Inhibition Screening Test
for Calcium Carbonate
Inhibitor: Polymer E
Dosage: 15 ppm inhibitor as actives

| Ozonation Time | Ozone Level* | Saturation Ratio |
|---|---|---|
| no ozone | 0.0 ppm | 28.6 ± 6.6 |
| 2.5% O3 output | | |
| 30 minutes $O_3$ | 0.4–0.5 ppm | 52.6 ± 6.6 |
| 60 minutes $O_3$ | 0.3 ppm | 65.2 ± 6.6 |
| 15% O3 output | | |
| 90 minutes $O_3$ | 2.3 ppm+ | 80.0 ± 6.6 |

The saturation ratio values indicate that Polymer E is maintaining its calcium carbonate inhibition activity at unrealistically high ozone levels. Note that is is also a poor $CaCO_3$ inhibitor to begin with (solution was slightly turbid prior to ozonation), and ozonation increases the sample's performance. This is most probably due to the high molecular weight of the initial polymer (Mw -240,000).
*Ozone level was determined by the colorimetric Hach Test.

TABLE X

Benchtop Scale Inhibition Screening Test
for Calcium Carbonate
Inhibitor: Polymer F
Dosage: 15 ppm inhibitor as actives

| Ozonation Time | Ozone Level* | Saturation Ratio |
|---|---|---|
| no ozone | 0.0 ppm | 97.1 ± 6.6 |
| 2.5% O3 output | | |
| 30 minutes $O_3$ | 0.5 ppm | 103.3 ± 6.6 |
| 60 minutes $O_3$ | 0.9 ppm | 107.5 ± 6.6 |
| 25% O3 output | | |
| 90 minutes $O_3$ | 2.3 ppm+ | 103.3 ± 6.6 |

Though Polymer F is not a superior calcium carbonate inhibitor initially, it is still important since ozonation at extremely high levels does not decrease the sample's activity. Note that after a total of 90 minutes of ozonation, the saturation ratio is equivalent to the initial unozonated sample.
*Ozone level was determined by the Hach Test.

TABLE XI

Benchtop Scale Inhibition Screening Test
for Calcium Carbonate
Inhibitor: Polymer G
Dosage: 15 ppm inhibitor as actives

| Ozonation Time | Ozone Level* | Saturation Ratio |
|---|---|---|
| no ozone | 0.0 ppm | 97.1 ± 6.6 |
| 2.5% O3 output | | |
| 30 minutes $O_3$ | 0.10 ppm | 113.7 ± 6.6 |
| 60 minutes $O_3$ | 0.70 ppm | 122.9 ± 6.6 |
| 15% O3 output | | |
| 90 minutes $O_3$ | −2.0-2.3 ppm+ | 97.1 ± 6.6 |

Polymer G is a 70% acrylic acid/30% acrylamide polymer with a MW −30,000. The saturation ratio values for this experiment demonstrate that even after 90 minutes of ozonation (30 minutes at a high level), this polymer has the same level of performance as the initial sample. Overall however, this sample is not the best inhibitor of choice for a good calcium carbonate inhibitor.
*Ozone level was determined by the colorimetric Hach Test.

TABLE XII

Benchtop Scale Inhibition Screening Test
for Calcium Carbonate
Inhibitor: Polymer H
Dosage: 15 ppm inhibitor as actives

| Ozonation Time | Ozone Level* | Saturation Ratio |
|---|---|---|
| no ozone | 0.0 ppm | 107.5 ± 6.6 |
| 2.5% O3 output | | |
| 30 minutes $O_3$ | 0.3 ppm | 122.9 ± 6.6 |
| 60 minutes $O_3$ | 0.45 ppm | 107.5 ± 6.6 |
| 25% O3 output | | |
| 90 minutes $O_3$ | 1.4 ppm+ | 85.4 ± 6.6 |

This is an example of a polymer that maintained calcium carbonate inhibition activity for the initial 60 minutes of ozonation, but after an additional 30 minutes of high ozonation, lost activity.
*Ozone level was determined by the Hach Test.

TABLE XIII

Benchtop Scale Inhibition Screening Test
for Calcium Carbonate
Inhibitor: Polymer I
Dosage: 15 ppm inhibitor as actives

| Ozonation Time | Ozone Level* | Saturation Ratio |
|---|---|---|
| no ozone | 0.0 ppm | 125.9 ± 6.6 |
| 2.5% O3 output | | |
| 30 minutes $O_3$ | 0.4–0.5 ppm | 116.8 ± 6.6 |
| 60 minutes $O_3$ | 0.4–0.5 ppm | 116.8 ± 6.6 |
| 25% O3 output | | |
| 90 minutes $O_3$ | 1.15 ppm | 97.1 ± 6.6 |

Polymer I, a terpolymer of acrylic acid, methacrylic acid and itaconic acid, also lost calcium carbonate inhibition activity upon extended exposure to ozone.
*Ozone level was determined by the Hach test.

TABLE XIV

Benchtop Scale Inhibition Screening Test
for Calcium Carbonate
Inhibitor: Polymer J
Dosage: 15 ppm inhibitor as actives

| Ozonation Time | Ozone Level* | Saturation Ratio |
|---|---|---|
| no ozone | 0.0 ppm | 85.4 ± 6.6 |
| 2.5% O3 output | | |
| 30 minutes $O_3$ | 0.8 ppm | 80.0 ± 6.6 |
| 60 minutes $O_3$ | 0.5 ppm | 85.4 ± 6.6 |
| 15% O3 output | | |
| 90 minutes $O_3$ | 2.3+ ppm | 69.9 ± 6.6 |

Polymer J is a polymethacrylic acid with a Mw −25,000-30,000 and is not a very good calcium carbonate inhibitor. The saturation ratio values above, indicate that this sample maintains activity for the first 60 minutes of low level ozonation (<1.0 ppm), but when exposed to higher concentrations for an additional 30 minutes, it begins to lose activity. Although functional, this material would not be preferred.
*Ozone level was determined by the colorimetric Hach test.

TABLE XV

Benchtop Scale Inhibition Screening Test
for Calcium Carbonate
Inhibitor: Polymer L
Dosage: 15 ppm inhibitor as actives

| Ozonation Time | Ozone Level* | Saturation Ratio |
|---|---|---|
| no ozone | 0.0 ppm | 107.5 ± 6.6 |
| 2.5% O3 output | | |
| 30 minutes O3 | 0.6 ppm | 110.6 ± 6.6 |
| 60 minutes O3 | 0.46 ppm | 122.9 ± 6.6 |
| 15% O3 output | | |
| 90 minutes O3 | 1.23 ppm | 113.7 ± 6.6 |

The saturation ratio values indicate that Polymer L, an acrylic acid/hydroxypropylacrylate copolymer does maintain calcium carbonate inhibition activity after ozonation. The activity of the sample before ozonation and after 90 minutes of low and high exposure to ozone are essentially equivalent.
*Ozone level was determined by the indigo method and used a Hach DR 2000 direct reading spectrophotometer.

TABLE XVI

Benchtop Scale Inhibition Screening Test
for Calcium Carbonate
Inhibitor: Polymer M
Dosage: 15 ppm inhibitor as actives

| Ozonation Time | Ozone Level* | Saturation Ratio |
|---|---|---|
| no ozone | 0.0 ppm | 131.9 ± 6.6 |
| 2.5% O3 output | | |
| 30 minutes O3 | 0.65 ppm | 148.5 ± 6.6 |
| 60 minutes O3 | 0.69 ppm | 131.9 ± 6.6 |
| 15% O3 output | | |
| 90 minutes O3 | 1.39 ppm | 131.9 ± 6.6 |

The saturation ratio values indicate that Polymer M a 70M % acrylic acid/30M % AMPS copolymer, MW −12,300, does maintain calcium carbonate inhibition activity after ozonation. The activity of the sample before ozonation and after 90 minutes of low and high exposure to ozone are essentially equivalent. In fact, the saturation ratios indicate that this sample is a very good calcium carbonate inhibitor.
*Ozone level was determined by the indigo method and used a Hach DR 2000 direct reading spectrophotometer.

TABLE XVIII

Ozonation of Phosphonates at 40 C.

| Inhibitor | % O3 Output | O3 Level | Comments |
|---|---|---|---|
| Blank | 12.5% | ~.25 ppm | turbid after 15 min of O3 |
| PBTC | 12.5% | <0.1 ppm | turbid after 30 min of O3 |
| HEDP | 12.5% | ~0.1 ppm | turbid after 15 min of O3 |

Each of these phosphonates were ozonated in 360 ppm Ca, 200 ppm Mg, 500 ppm alkalinity (as CaCO3) water at 40 C.. As the comments above indicate, the test solution became turbid within 30 minutes of ozonation. This indicated that the critical breakpoint pH had passed and testing a cloudy solution for CaCo3 inhibition would be meaningless. Additional tests by LC showed the destruction of the phosphonates.
PBTC - 1,2,4-tri-carboxy-2-phosphono-butane
HEDP - 1-hydroxyethylidine-1,1-diphosphonic acid

TABLE XVIII

Benchtop Scale Inhibition Screening Test
for Calcium Carbonate
Inhibitor: PBTC - 18-20° C. (Ambient Temperature)
Dosage: 15 ppm inhibitor as actives

| Ozonation Time | Ozone Level* | Saturation Ratio |
|---|---|---|
| no ozone | 0.0 ppm | 143.2 ± 6.6 |
| 2.5% O3 output | | |
| 30 minutes O3 | 0.36 ppm | 134.8 ± 6.6 |
| 60 minutes O3 | 0.66 ppm | 128.9 ± 6.6 |
| 15% O3 output | | |
| 90 minutes O3 | 0.98 ppm | 80.0 ± 6.6 |

The saturation ratio values indicate that the phosphonate PBTC is not maintaining calcium carbonate inhibition activity after ozonation. The last sample collected after 90 minutes of ozonation was slightly turbid in the hot water bath (60 C.), prior to the saturation ratio test. Note that before ozonation, PBTC is an excellent scale inhibitor, but then declines in activity with extended exposure to ozone.
*Ozone level was determined by the indigo method and used a Hach DR 2000 direct reading spectrophotometer.

Our invention has been set forth above and includes not only those methods described above, but also a method of inhibiting hardness scale formation on heat transfer surfaces in contact with ozonated cooling waters, which waters have the following characteristics:

| Parameters | Range |
|---|---|
| pH | 6.5-9.7 |
| Ca Hardness | 20-2000 ppm (based on CaCO3) |
| Mg Hardness | 10-1000 ppm |
| Total Hardness | 30-3000 ppm |
| SiO2 | 0.1-125 ppm (as SiO2) |
| "M" alkalinity | 50-2500 ppm (as CaCO3) |
| Ozone Residual Concentration | 0.01-2.5+ (saturation) |
| Temperature | 10° C.-60° C. | which method comprises adding to said ozonated cooling waters at least 2 parts per million, based on treated waters, of an organic, water soluble, vinylic polymer having an initial calcium carbonate saturation ratio of at least 90, said polymer containing at least 50 mole percent (meth)acrylic acid and having an initial weight average molecular weight ranging from about 1500 to about 35,000 and further, said polymer capable of retaining at least 70 percent, preferably at least 80 percent, and most preferably at least 85 percent of its original and initial calcium carbonate saturation ratio after exposure to ozone at ozone concentrations of at least 0.1 parts per million and ranging to 2.3 parts per million in cooling waters containing ozone such that after exposure to ozone at the above concentrations said polymers are reacted with said ozone in said cooling waters for at least 30 minutes, preferably 60 and most preferably at least 90 minutes at temperatures ranging from about 18° C. to about 60° C.

Our methods include those methods of treating ozonated cooling waters with polymers as described above where the polymer is added to the ozonated cooling waters to obtain an initial total polymer concentration of at least 2 ppm active polymer(s) and preferably, from about 5 to about 100 parts per million total active polymer based on treated waters and wherein the polymer is chosen from at least one polymer having the following characteristics:

| Polymer | Initial Mole Weight | Mole Percent Acrylic Acid | Mole Percent Other Monomers | Initial Calcium Carbonate Saturation Ratio |
|---|---|---|---|---|
| Homopolymer of AA | 2000-15,000 | 100% | — | at least 110 |
| Homopolymer of MAA | 2000-10,000 | — | 100% methacrylic acid | at least 90 |
| Copolymer of AA/MAA | 2000-15,000 | 5-95% | 95-5 methacrylic acid | at least 90 |
| Copolymer of AA/AcAm | 5000-35,000 | 50-95% | 5-50% acrylamide | at least 90 |
| Copolymer of AA/AMS/ | 2500-25,000 | 50-80% | 20-50% AMS | at least 100 |

-continued

| Polymer | Initial Mole Weight | Mole Percent Acrylic Acid | Mole Percent Other Monomers | Initial Calcium Carbonate Saturation Ratio |
|---|---|---|---|---|
| AcAm | | | 0-30% AcAm | |
| Copolymer of AA/ $C_{1-3}$ Ester of AA | 2000-20,000 | 80-98% | 2-20% $C_{1-3}$ Ester of AA | at least 110 |
| Copolymer of AA/AES/ AcAm | 2500-25,000 | 60-80% | 20-40% AES 0-20% AcAm | at least 90 |
| Copolymer of AA/AMPS | 5000-15,000 | 65-80% | 20-35% AMPS | at least 90 |
| Copolymer of AA/HPA | 5000-10,000 | 70-80% | 20-30% HPA | at least 90 |

*AA = acrylic acid
MA = methacrylic acid
AcAm = acrylamide
AMS = $H_2O=CHCONHCH_2SO_3H$
AES = $H_2O=CHCONHCH_2CH_2SO_3H$ AMPS = $H_2O=CHCONHCH_2CHCH_2SO_3H$
$\phantom{AMPS = H_2O=CHCONHCH_2CH}|$
$\phantom{AMPS = H_2O=CHCONHCH_2CH}CH_3$

HPA = $H_2O=CHCOOCH_2CH_2CH_2OH$

Having described our invention, we claim:

1. A method of treating recirculating cooling waters comprising adding thereto, in effective amounts to inhibit microbiological growth and inorganic scale formation including calcium carbonate on heat transfer surfaces, both ozone and an organic water soluble vinylic polymer having an initial Calcium Carbonate Saturation Ratio of at least 90 and containing at least 50 mole percent (meth)acrylic acid, or its salts, and having a weight average molecular weight ranging from about 1500 to about 35,000, which polymer is further characterized in that after exposure to at least 0.1 ppm ozone in waters for at least 30 minutes at temperatures ranging from about 18° C. to about 60° C., the polymer retains at least 70 percent of its original calcium carbonate saturation ratio, wherein ozone is added to the cooling waters at sufficient rate to maintain an ozone residual concentration of at least 0.01 parts per million, based on cooling waters treated, and further wherein the cooling waters being treated have the following characteristics:

| Parameters | Range |
|---|---|
| pH | 6.5-9.7 |
| Ca Hardness | 20-2000 ppm (based on $CaCO_3$) |
| Mg Hardness | 10-1000 ppm |
| Total Hardness | 30-3000 ppm |
| $SiO_2$ | 0.1-125 ppm (as $SiO_2$) |
| "M" alkalinity | 25-2500 ppm (as $CaCO_3$) |
| Ozone Residual Concentration | 0.01-2.5 (saturation) |
| Temperature | 10° C.-60° C. | has been inserted.

2. The method of claim 1 wherein the organic water soluble vinylic polymer is a homopolymer or copolymer of (meth)acrylic acid, and its water soluble salts.

3. The method of claim 2 wherein the polymer is a homopolymer of acrylic acid having an initial molecular weight of from 2,000-10,000 and an initial calcium carbonate saturation ratio of at least 100.

4. The method of claim 2 wherein the ozone residual concentration is maintained at at least 0.05 ppm, and the polymer is a homopolymer of methacrylic acid having an initial molecular weight of from 2,000-25,000, and an initial calcium carbonate saturation ratio of at least 80.

5. The method of claim 1 wherein the organic water soluble vinylic polymer is a copolymer of (meth)acrylic acid, and its water soluble salts thereof, with at least one of the vinylic monomers chosen from the group consisting of (meth)acrylamide, maleic anhydride, N-methyl sulfonic acid-(meth)acrylamide, N-ethyl sulfonic acid-(meth)acrylamide, itaconic acid, $C_1$-$C_3$ esters of acrylic acid, hydroxypropylacrylate, N-t-butylacrylamide, acrylamido methyl propane sulfonic acid, and vinyl acetate, and further wherein the organic water soluble vinylic polymer initially contains at least 60 mole percent of (meth)acrylic acid, or its salts.

6. The method of claim 5 wherein the ozone level is maintained at a concentration of at least 0.1 ppm, based on treated cooling waters, and wherein the copolymer is chosen from the group consisting of at least one polymer having the characteristics:

| Initial $C_aCO_3$ Saturation Ratio at least | Polymer | Mole Percent Acrylic Acid | Initial Mole Weight | Other Monomer and Mole Percent |
|---|---|---|---|---|
| 80 | acrylic acid/acrylamide | 60-95 | 5,000-35,000 | Acrylamide; 5-40 |
| 80 | acrylic acid/ methylsulfonic acid-(meth)acrylamide/ Acrylamide | 50-60 | 5,000-20,000 | N-methylsulfonic acid-(meth)acrylamide; 10-50 Acrylamide; 0-40 |
| 80 | acrylic acid/ N-ethylsulfonic acid-(meth)acrylamide/ Acrylamide | 50-90 | 10,000-40,000 | N-ethylsulfonic acid-(meth)acrylamide; 10-50 Acrylamide; 0-40 |
| 80 | acrylic acid, methacrylic acid, itaconic acid | 50-70 | 1,000-10,000 | Methacrylic Acid; 5-50 Itaconic Acid; 0-25 |
| 90 | acrylic acid, $C_1$-$C_3$ esters of acrylic acid | 70-98 | 2,500-10,000 | $C_1$-$C_3$ ester of acrylic acid; 2-30 |
| 90 | acrylic acid/ Acrylamidomethylpropane sulfonic acid | 65-80 | 10,000-15,000 | Acrylamidomethylpropane sulfonic acid; 20-35 |
| 90 | acrylic acid/ Hydroxypropyl acrylate | 70-80 | 5,000-10,000 | Hydroxypropyl Acrylate; 20-30 |

7. The method of claims 1, 2, 3, 4, 5, or 6 wherein the polymer is added to the recirculating cooling waters either incrementally or continuously at a rate sufficient to obtain an initial active polymer concentration in the cooling waters of at least 2 ppm, based on treated cooling waters.

8. A method of inhibiting hardness scale formation including calcium carbonate on heat transfer surfaces in contact with ozonated cooling waters having the following characteristics:

| Parameters | Range |
| --- | --- |
| pH | 6.5–9.7 |
| Ca Hardness | 20–2000 ppm (based on $CaCO_3$) |
| Mg Hardness | 10–1000 ppm |
| Total Hardness | 20–3000 ppm |
| $SiO_2$ | 0.1–125 ppm (as $SiO_2$) |
| "M" alkalinity | 20–2500 ppm (as $CaCO_3$) |
| Ozone Residual Concentration | 0.01–2.5 (saturation) |
| Temperature | 10° C.–60° C. | which comprises adding to said ozonated cooling waters at least 2 ppm, based on treated waters, of an organic, water soluble, vinylic polymer having an initial calcium carbonate saturation ratio of at least 90, said polymer having an initial weight average molecular weight ranging from about 1500 to about 35,000, and further, said polymer capable of retaining at least 70 percent of its original calcium carbonate saturation ratio after exposure to ozone at ozone concentrations of at least 0.1 ppm in said cooling waters for at least 30 minutes at temperatures ranging from 18° C. to about 60° C.

9. The method of claim 8 wherein the polymer is added to the ozonated cooling waters to obtain initial total polymer concentrations of from about 5 to about 50 ppm, based on treated waters, and wherein the polymer is chosen from at least one polymer having the following characteristics:

| Polymer | Initial Mole Weight | Mole Percent Acrylic Acid | Mole Percent Other Monomers | Initial Calcium Carbonate Saturation Ratio |
| --- | --- | --- | --- | --- |
| Homopolymer of Acrylic Acid | 2,000–15,000 | 100% | — | at least 110 |
| Homopolymer of Methacrylic Acid | 2,000–10,000 | — | 100% methacrylic | at least 90 |
| Copolymer of Acrylic Acid/Methacrylic Acid | 2,000–15,000 | 5–95% | 95%–5% methacrylic acid | at least 90 |
| Copolymer of Acrylic Acid/Acrylamide | 5,000–35,000 | 50–95% | 5–50% acrylamide | at least 90 |
| Copolymer of Acrylic Acid/N-methylsulfonic acid-(meth)acrylamide/Acrylamide | 2,500–25,000 | 50–80% | 20–50% N-methylsulfonic acid-(meth)acrylamide 0–30% Acrylamide | at least 100 |
| Copolymer of Acrylic acid $C1_{1-3}$ Ester of Acrylic Acid | 2,000–20,000 | 80–98% | 2–20% $C_{1-3}$ Ester of Acrylic Acid | at least 110 |
| Copolymer of Acrylic Acid/N-ethylsulfonate acid-(meth)acrylamide/Acrylamide | 2,500–25,000 | 60–80% | 20–40% N-ethylsulfonic acid-(meth)acrylamide 0–20% Acrylamide | at least 90 |
| Copolymer of Acrylic Acid/Acrylamidomethylpropane sulfonic acid | 10,000–15,000 | 65–80% | 20–35% Acrylamidomethylpropane sulfonic acid | at least 90 |
| Copolymer of Acrylic Acid/Hydroxpropyl acrylate | 5,000–10,000 | 70–80% | 20–30% Hydroxypropyl acrylate | at least 90 |

* * * * *

UNITED STATES PATENT AND TRADEMARK OFFICE
CERTIFICATE OF CORRECTION

PATENT NO. : 5,171,451

DATED : DECEMBER 15, 1992

INVENTOR(S) : BINAIFER S. KHAMBATTA, PAUL R. YOUNG & KENNETH E. FULKS

It is certified that error appears in the above-identified patent and that said Letters Patent is hereby corrected as shown below:

In Claim 1, column 16, line 19, delete "has been inserted"

Signed and Sealed this

Twenty-sixth Day of October, 1993

Attest:

BRUCE LEHMAN

Attesting Officer     Commissioner of Patents and Trademarks